United States Patent
Kim et al.

(10) Patent No.: US 9,606,283 B2
(45) Date of Patent: Mar. 28, 2017

(54) SURFACE LIGHT SOURCE, BACKLIGHT MODULE AND DISPLAY DEVICE

(71) Applicant: BOE TECHNOLOGY GROUP CO., LTD., Beijing (CN)

(72) Inventors: Kiman Kim, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 14/422,281

(22) PCT Filed: May 27, 2014

(86) PCT No.: PCT/CN2014/078510
§ 371 (c)(1),
(2) Date: Feb. 18, 2015

(87) PCT Pub. No.: WO2015/109707
PCT Pub. Date: Jul. 30, 2015

(65) Prior Publication Data
US 2016/0033703 A1   Feb. 4, 2016

(30) Foreign Application Priority Data

Jan. 22, 2014 (CN) .......................... 2014 1 0030483

(51) Int. Cl.
*F21V 7/04* (2006.01)
*F21V 8/00* (2006.01)
*G02F 1/1335* (2006.01)

(52) U.S. Cl.
CPC ........... *G02B 6/001* (2013.01); *G02B 6/0006* (2013.01); *G02B 6/0033* (2013.01); *G02F 1/1336* (2013.01)

(58) Field of Classification Search
CPC .... G02B 6/001; G02B 6/0006; G02B 6/0033; G02F 1/1336
(Continued)

(56) References Cited

U.S. PATENT DOCUMENTS

| 2001/0050667 | A1 | 12/2001 | Kim et al. | |
|---|---|---|---|---|
| 2008/0304791 | A1* | 12/2008 | Takatori | G02B 6/001 385/39 |
| 2010/0066254 | A1* | 3/2010 | Ott | G02B 6/0003 315/129 |

FOREIGN PATENT DOCUMENTS

| CN | 101666462 A | 3/2010 |
|---|---|---|
| CN | 202452315 U | 9/2012 |

(Continued)

OTHER PUBLICATIONS

PCT International Search Report for Application No. PCT/CN2014/078510.
(Continued)

*Primary Examiner* — Bao Q Truong
*Assistant Examiner* — Hana Featherly
(74) *Attorney, Agent, or Firm* — Nath, Goldberg & Meyer; Joshua B. Goldberg; Christopher Thomas

(57) ABSTRACT

The invention relates to the field of display technology, and particularly to a surface light source, a backlight module and a display device. The surface light source of the invention comprises at least one optical fiber and at least one light source, wherein the at least one light source is provided at one end of the at least one optical fiber one to one, the at least one optical fiber each is provided with a plurality of light outgoing windows along its length direction, a light beam emitted from each light source propagates in a corresponding optical fiber, and outgoes from the optical fiber through the plurality of light outgoing windows. The surface light source and the backlight module adopting the surface light (Continued)

source have advantages of wide gamut, high efficiency and high light focusing effect. The display device adopting the backlight module has better display effect.

19 Claims, 3 Drawing Sheets

(58) Field of Classification Search
USPC .......................................................... 362/553
See application file for complete search history.

(56) References Cited

FOREIGN PATENT DOCUMENTS

| CN | 102853346 A | 1/2013 |
|----|-------------|--------|
| CN | 102913886 A | 2/2013 |
| CN | 103807672 A | 5/2014 |
| KR | 20090053000 A | 5/2009 |
| KR | 1020090053000 A | 5/2009 |

OTHER PUBLICATIONS

Chinese First Office Action dated Dec. 4, 2014 corresponding to application No. 201410030483.X.
Chinese Second Office Action dated May 5, 2015 corresponding to application No. 201410030483.X.

\* cited by examiner

□ - Red    ○ - Green    △ - Blue

SURFACE LIGHT SOURCE, BACKLIGHT MODULE AND DISPLAY DEVICE

This is a National Phase Application filed under 35 U.S.C. 371 as a national stage of PCT/CN2014/078510, filed May 27, 2014, an application claiming the benefit to Chinese Application No. 201410030483.X, filed Jan. 22, 2014 the content of each of which is hereby incorporated by reference in its entirety.

FIELD OF THE INVENTION

The present invention belongs to the field of display technology, and particularly to a surface light source, a backlight module and a display device.

BACKGROUND OF THE INVENTION

Since liquid crystals cannot emit light by themselves, a backlight module is used as a light source for providing uniform brightness to the liquid crystal panel in a liquid crystal display. In generally, the backlight module converts a typical point light source or linear light source into a surface light source with a high brightness and a uniform brilliance through a series of optical sheets, so that the display panel can display images normally.

Generally, the backlight module mainly includes a light source, a reflector, a light guide plate, a frame and the like. In the prior art, the light source includes a cold cathode fluorescent lamp (CCFL) or a LED (light emitting diode), light beams emitted from these light sources are generally dispersed after being guided by the light guide plate, the focusing effect is poor, it is necessary to adopt an additional prism sheet to focus the dispersed light beams, so as to improve focusing effect, thus the brightness of the backlight module can be increased. In addition, these light sources have defects such as narrow color gamut and low efficiency.

Hence, it has become a problem to be solved urgently at present to realize high focusing effect, wide color gamut and high efficiency of the backlight module.

SUMMARY OF THE INVENTION

In view of the above defects, the technical problem to be solved by the present invention is to provide a surface light source, a backlight module and a display device, wherein the backlight module has advantages such as wide color gamut, high efficiency and improved focusing effect.

A solution adopted to solve the problem by the present invention is a surface light source, which comprises at least one optical fiber and at least one light source, wherein the at least one light source is provided at one end of the at least one optical fiber one to one, the at least one optical fiber each is provided with a plurality of light outgoing windows with an interval therebetween along its length direction, a light beam emitted from each light source propagates in an optical fiber corresponding to the light source, and outgoes from the optical fiber through the plurality of light outgoing windows.

Preferably, the at least one optical fiber is arranged in a linear manner or with its central axis bent, the central axis of the at least one optical fibers is arranged in one arrangement plane, and the light outgoing windows of each of the at least one optical fiber are arranged on at least one side of the arrangement plane.

Preferably, the farther the distance from the corresponding light source is, the larger the arrangement density of the light outgoing windows of each of the at least one optical fiber is.

Preferably, each of the light outgoing windows of each of the at least one optical fiber is a grating, which has a plurality of slits with an equal interval therebetween, on the surface of the optical fiber, and wherein the arrangement direction of the slits is perpendicular to the length direction of the optical fiber.

Preferably, the light source is a laser light source, and laser beam emitted from the laser light source is transmitted along the optical fiber and outgoes from the optical fiber through the gratings.

Preferably, the inter-line period of the grating and the wavelength of the laser beam satisfy the following formula:

$0.5 \leq \Lambda/\lambda \leq 1$, where $\Lambda$ is the inter-line period of the grating, and $\lambda$ is the wavelength of the laser beam.

Preferably, an incidence angle at which the laser beam is incident on the optical fiber and an emergence angle at which the laser beam outgoes from the grating satisfy the following formula:

$n' \sin \phi_m - n_s \sin \theta_{in} = \lambda \cdot m/\Lambda$, where $\theta_{in}$ is the incidence angle at which the laser beam is incident on the grating, $\phi_m$ is the emergence angle at which the laser beam outgoes from the grating, n' is the refractivity of air, $n_s$ is the refractivity of the grating, and m is the order of the diffraction spectrum of the grating.

Preferably, the incidence angle at which the laser beam is incident on the grating is within a range from 50° to 80°, and the emergence angle at which the laser beam outgoes from the grating is within a range from −15° to 15°.

Preferably, the optical fiber includes a core wire and a protection layer which are coaxially arranged, and wherein the protection layer is wrapped around the core wire and is made of transparent resin, and the light outgoing windows are provided in the protection layer.

Preferably, the optical fiber is constituted by a core wire, and the light outgoing windows are provided on the outer surface of the core wire.

Preferably, the at least one optical fiber includes three optical fibers which are arranged parallel to each other with central axes thereof bent and the central axes are arranged in the same arrangement plane; the at least light source includes a red laser light source, a green laser light source and a blue laser light source, each of which is provided at one end of one of the three optical fibers, respectively.

Preferably, a red laser beam, a green laser beam and a blue laser beam emitted from the red laser light source, the green laser light source and the blue laser light source respectively are mixed after outgoing from the light outgoing windows to form white light.

The invention further provides a backlight module comprising any one of the above surface light sources.

Preferably, the arrangement plane is parallel to a display panel.

Preferably, the light outgoing windows of the optical fibers face towards the display panel.

Preferably, the light outgoing windows of the optical fibers are directed away from the display plane, the backlight module further comprises a reflective film, and the optical fibers are provided between the reflective film and the display panel.

Preferably, a part of the light outgoing windows of the optical fibers face towards the display panel, and the other part of the light outgoing windows of the optical fibers are directed away from the display panel, and the optical fibers are provided between the reflective film and the display panel.

Preferably, the backlight module further comprises a diffusion film, which is provided between the optical fibers and the display panel.

The invention further provides a display device comprising any one of the above backlight modules.

The present invention has following advantageous effects: the surface light source provided in the present invention has advantages of high focusing effect, wide color gamut and high efficiency, accordingly, the backlight module using the surface light source has advantages of high focusing effect, wide color gamut and high efficiency, and moreover, the display device using the back light module has better display effect.

DESCRIPTION OF REFERENCE SIGNS

1—light source; 2—optical fiber; 21—core wire; 22—protection layer; 3—light outgoing window; 30—grating.

DETAILED DESCRIPTION OF THE EMBODIMENTS

In order to make persons skilled in the art better understand the solutions of the present invention, a surface light source, a backlight module and a display device provided by the present invention will be further described in detail in conjunction with the accompanying drawings and embodiments.

Embodiment 1

The present embodiment provides a surface light source. As a light emitting mode, compared to a LED point light source and a common lamp light source, the surface light source, such as a flat light source, has characteristics of emitting light softly, unharmful to eyes, saving electricity, light beam being natural etc., and is an important development direction of light source products in the future.

Figure 1:
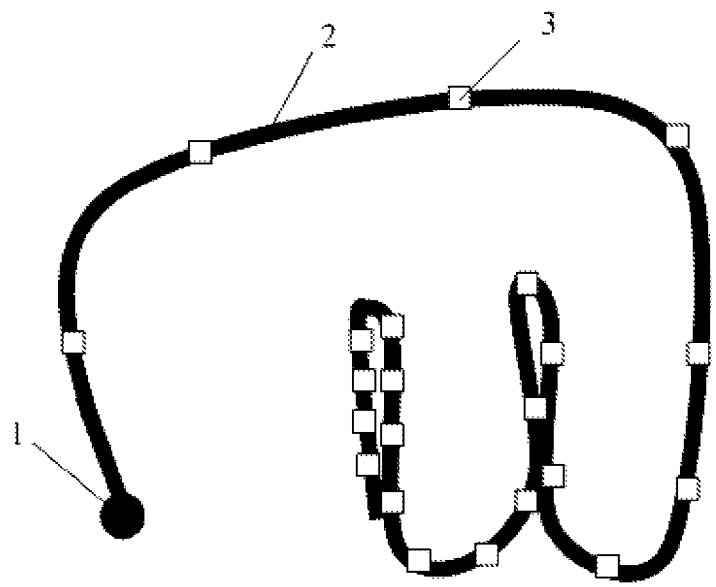
FIG. 1 is a structural diagram of a surface light source according to embodiment 1 of the present invention.

As shown in FIG. 1, the surface light source in the present embodiment comprises an optical fiber 2 and a light source 2 providing at one end of the optical fiber 2, wherein the optical fiber 2 is provided with a plurality of light outgoing windows 3 separatedly along its length direction, the light beams emitted from the light source 1 propagate along the optical fiber 2, and outgo from the optical fiber 2 through the light outgoing windows 3. Each of the light outgoing windows 3 on the optical fiber is a grating 30 formed with a plurality of slits which are equally spaced on the surface of the optical fiber 2, wherein the arrangement direction of the slits is perpendicular to the length direction of the optical fiber 2, that is, one light outgoing window 3 is a grating 30. It should be noted that, in the present embodiment, while description is made taking only one optical fiber 2 and one light source 1 for example, the invention is not limited thereto. In contrast, the embodiment may include more than two optical fibers and light sources corresponding to the optical fibers one to one.

In the present embodiment, the light source 1 is a laser light source, and laser beams emitted from the laser light source are transmitted along the optical fiber 2 and outgo from the optical fiber 2 through the gratings 30. Meanwhile, the optical fiber 2 is arranged in a linear manner or with its central axis bent, and the central axis of the optical fiber is arranged in one arrangement plane, the light outgoing windows 3 are provided on one side of the optical fiber 2 above the arrangement plane (as shown in FIG. 2) and/or provided on one side of the optical fiber 2 below the arrangement plane (in a direction which is opposite to that as shown in FIG. 2, and is not shown) so as to form a surface light source, the brightness intensity of which can be easily controlled.

Figure 2:
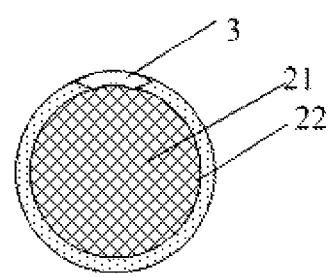
FIG. 2 is a cross sectional diagram of an optical fiber in FIG. 1 taken in a direction perpendicular to its length direction.

In a case where a surface light source is formed of a plurality optical fibers and a plurality of light sources, the optical fibers may be arranged parallel to each other in a linear manner, or arranged parallel to each other with their central axes bent, and the central axes of the optical fibers are arranged in one arrangement plane, the light outgoing windows 3 of each of the optical fibers are provided on one side of the optical fiber above the arrangement plane (as shown in FIG. 2) and/or provided on one side of the optical fiber below the arrangement plane (in a direction which is opposite to that as shown in FIG. 2, and is not shown) so as to form a surface light source, the brightness intensity of which can be easily controlled.

Figure 3:
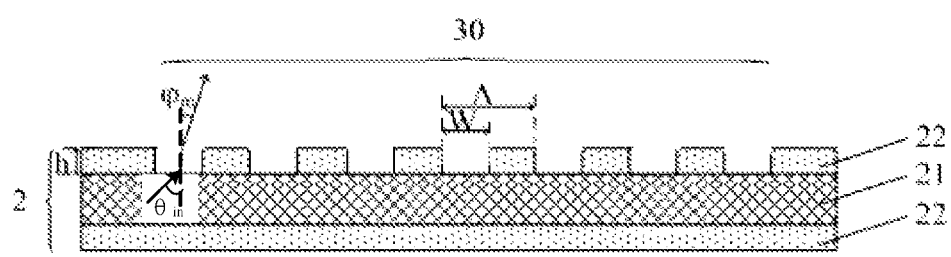
FIG. 3 is a cross sectional diagram of the optical fiber in FIG. 2 taken in its length direction.
Figure 4:
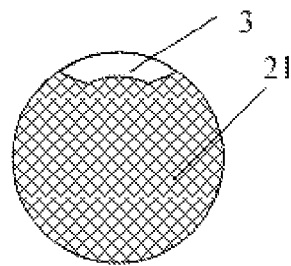
FIG. 4 is another cross sectional diagram of an optical fiber in FIG. 1 taken in a direction perpendicular to its length direction.
Figure 5:
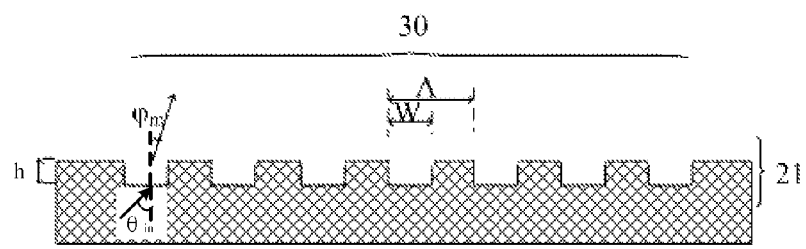
FIG. 5 is a cross sectional diagram of the optical fiber in FIG. 4 taken in its length direction.

An optical fiber typically is a slender cylindrical solid composite fiber, in the present embodiment, as shown in FIG. 2 and FIG. 3, the optical fiber 2 is of a multilayer coaxial cylindrical solid structure, which consists of a core wire 21 and a protection layer 22 which are coaxially arranged, wherein the protection layer 22 is wrapped around the core wire 21; the core wire 21 and the protection layer 22 constitute a dielectric optical waveguide together so as to transmit and restrict the light beam to realize a light transmission. The protection layer 22 is made of transparent resin, and the light outgoing windows 3 are gratings 30, each of which includes a plurality of slits formed with an equal interval therebetween, and which are provided in the protection layer 22. Alternatively, as shown in FIG. 4 and FIG. 5, the optical fiber 2 consists of only a core wire 21, and the light outgoing windows 3 are gratings 30, each of which includes a plurality of slits, and which are provided in the outer surface of the protection layer 22. The core wire 21 is typically made of silicon oxide, thus a refractivity of the optical fiber to light is within 1.5-1.6.

Since attenuation may occur in laser beam during the laser beam is transmitting in the optical fiber 2, in order to ensure brightness uniformity all over the surface light source, preferably, further away from one end of the optical fiber 2 provided with the light source 1, denser the light outgoing windows 3 are provided, that is, the density of the outgoing light windows 3 (gratings 30) is increased with the distances from them to a light outgoing end of the laser light source increases.

The gratings 30 may be formed using a patterning process. Specifically, when the gratings 30 are formed in the protection layer 22 of the optical fiber 2, the grating with a plurality of slits may be formed in the protection layer 22 through steps of photoresist coating, exposure, development, etching and the like, as shown in FIG. 2 and FIG. 3. At this time, thickness of the protection layer 22 is equal to height h of the grating 30.

As such, when the gratings 30 are formed in the outer surface of the core wire 21, they may also be formed by the above method.

In order to enable laser beam to outgo from the gratings 30, the inter-line period of the grating (that is, a period of a transmissive slit) and the laser wavelength satisfy the following formula:

$$0.5 \leq \Lambda/\lambda \leq 1 \qquad (1)$$

Where in the formula (1), $\Lambda$ is the inter-line period of the grating, and $\lambda$ is the wavelength of the laser beam emitted from the laser light source.

Efficiency of the grating 30 is decided by a height h and a width w of the slit thereof. In the present embodiment, as shown in FIG. 3, the width w of the slit is within a range of $0.05\lambda < W < 0.99\lambda$, if the width w of the slit is smaller than $0.05\lambda$, then diffraction efficiency of the grating 30 is low, amount of outgoing light is less, and manufacturing process is complex, and if the width w of the slit is larger than $0.99\lambda$, then most of the laser beams may be totally reflected, and thus diffraction efficiency of the grating 30 is low. The height h of the slit is within a range of $0.05\lambda < h < 5\lambda$, if the height h is smaller than $0.05\lambda$, then the diffraction efficiency of the grating 30 is low, and amount of outgoing light is less, and if the height h of the slit is larger than $5\lambda$, the manufacturing process is complex and difficult.

In the present embodiment, with reference to the diagram of an incidence angle and an emergence angle of the laser beam with respect to the grating 30, it is necessary for the incidence angle at which the laser beam is incident on the grating 30 and the emergence angle at which the laser emerges from the grating 30 to satisfy the following formula:

$$n' \sin \phi_m - n_s \sin \theta_{in} = \lambda \cdot m/\Lambda \qquad (2)$$

in the formula (2), n' is the refractivity of air, $n_s$ is the refractivity of the grating 30, $\theta_{in}$ is the incidence angle at which the laser beam is incident on the grating 30, $\phi_m$ is the emergence angle at which the laser outgoes from the grating, and m is the order of the diffraction spectrum of the grating 30, wherein m=0, ±1, ±2 . . . . It should be noted that, like the common incidence angle and emergence angle, the incidence angle and the emergence angle refers to those formed with respect to a normal line of a plane where a certain point of the grating 30 is located.

Preferably, the incidence angle at which the laser beam is incident on the grating 30 is within a range from 50° to 80°, and the emergence angle at which the laser beam outgoes from the grating 30 is within a range from −15° to 15°.

Preferably, when the incidence angle at which the laser is incident on the grating 30 is within a range from 60° to 70°, and a narrower range of the emergence angle with respect to the grating 30 may be obtained.

In an example, a red laser beam emitted from a red laser light source R has an incidence angle $\theta_{in}$=65°, the wavelength of the red laser beam is 635 nm, according to the formula (2), the inter-line period of the grating 30 in the optical fiber 2 corresponding to the red laser light source R may be 455 nm, n'=1, $n_s$=1.5, when m=0, 1, 2, −2, 3, −3 . . . , according to the formula (2), $\phi_m$ does not exist, that is to say, no diffraction occurs at this time, and all the laser beams are totally reflected; when m=−1, according to the formula (2), $\phi_m$ is approximately equal to 0 degree.

In the present embodiment, since the included angle between the light beams finally outgoing from the gratings 30 and the normal direction is within the range from −15° to 15°, that is, the laser beams outgo from the gratings 30 at an direction approximately perpendicular to the optical fiber after passing through the gratings 30, so that the surface light source has a better focusing effect.

Special requirements are always needed on the surface light source in many occasions, therefore, using laser light sources of different colors and combining more than one optical fibers and a plurality of gratings according to the color mixing principle, requirements on surface light sources of different colors and luminescence area may be satisfied.

The surface light source in the present embodiment includes a laser light sources and an optical fiber with gratings thereon, therefore, it has advantages of high focusing effect, wide color gamut, and high efficiency.

Embodiment 2

The present embodiment provides a backlight module, which is also referred to as a backlight source, for providing a light source for a display panel, wherein the backlight module comprises the surface light source in the embodiment 1.

Figure 6:
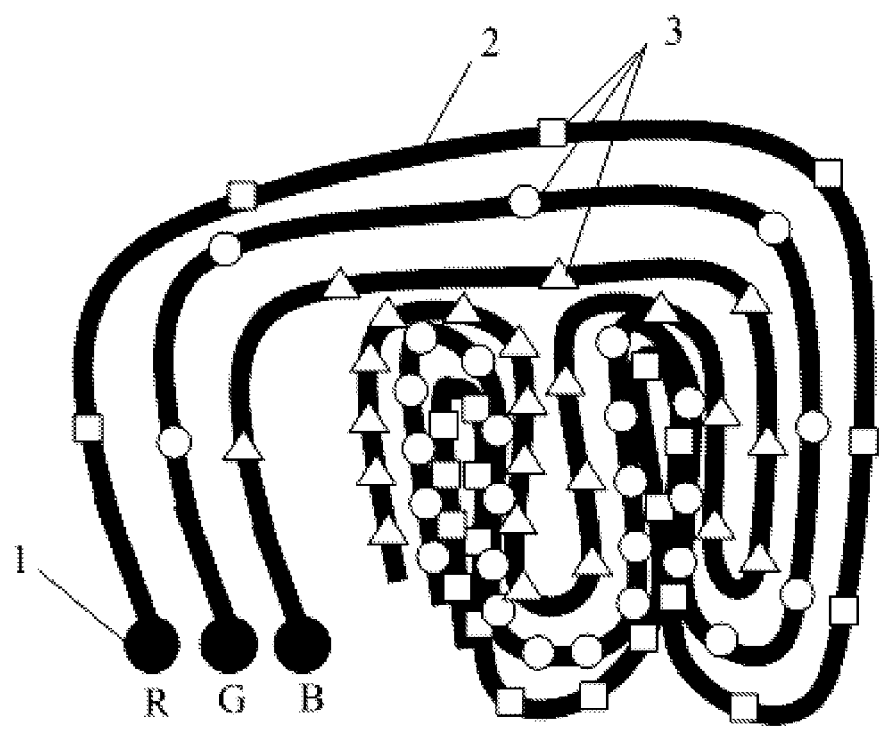
FIG. 6 is a structural diagram of a surface light source of a backlight module according to embodiment 2 of the present invention.

In the liquid crystal display technology, since the liquid crystals cannot emit light by themselves, a surface light source is commonly adopted as a light source. In the liquid crystal display device, the surface light source is required to be a white light source. As shown in FIG. 6, according to the color mixing principle of three primary colors, in the present embodiment, a surface light source comprises three optical fibers 2, central axes of which are parallel and bent, and arranged in one arrangement plane. In order to allow the best utilization of the light source, the three optical fibers 2 in the surface light source are preferably provided with the arrangement plane thereof parallel to the liquid crystal display panel, meanwhile, the light outgoing windows 3 face towards the liquid crystal display panel, so that the laser beams are directly incident on the liquid crystal display panel by passing through the gratings 30.

The light sources 1 include a red laser light source R, a green laser light source G and a blue laser light source B, each of which is provided at one end of one of the three optical fibers, respectively. A red laser beam, a green laser beam and a blue laser beam respectively emitted from the red laser light source R, the green laser light source G and the blue laser light source B are mixed together to form a white light beam after outgoing from the respective light outgoing windows 3 in corresponding optical fibers, and then the white light is provided to the liquid crystal display panel. Generally, the red laser beam has a wavelength of 635 nm, the green laser beam has a wavelength of 523 nm, and the blue laser beam has a wavelength of 470 nm, accordingly, according to the formula (2), an inter-line period of the grating 30 in the optical fiber 2 corresponding to the red laser light source R is 455 nm, an inter-line period of the grating 30 in the optical fiber 2 corresponding to the green laser light source G is 375 nm, and an inter-line period of the grating 30 in the optical fiber 2 corresponding to the blue laser light source B is 337 nm. In FIG. 6, the light outgoing windows corresponding to laser beams of different colors are identified by different graphics, wherein a square light outgoing window represents a light outgoing window for red laser beam, a circle light outgoing window represents a light outgoing window for green laser beam, and a triangle light outgoing window represents a light outgoing window for blue laser beam.

In the embodiment 1, an incidence angle at which the laser beam is incident on the grating 30 is within a range from 50° to 80°, and in the present embodiment, further preferably, the incidence angles at which the red laser beam, the green laser beam and the blue laser beam are incident on the gratings 30 are about 65°, so that the red laser beam, the green laser beam and the blue laser beam may have emergence angles (at which the laser beams outgo from the gratings 30) within a range from −15° to 15° by one transmission or reflection. Since the included angle between the light beam finally outgoing from the grating 30 and the normal line is within a range from −15° to 15°, the surface light source may emit light with a narrow angle, that is, the laser beam outgoes from the grating 30 in a direction approximately perpendicular to the optical fiber after passing through the grating 30, therefore the surface light source has better light focusing effect. The surface light source may obtain an excellent light focusing effect and thus a better backlight effect without focusing the dispersed light by the prism film in the prior art; meanwhile, since the laser is used as the light source, the surface light source may have advantages of wide gamut and high efficiency.

In the present embodiment, in the optical fibers 2 for transmitting the red laser beam, the green laser beam and the blue laser beam, the farther the distance from the light outgoing window 3 to the laser outputting end of the corresponding laser light source is, the larger the arrangement density of the light outgoing windows 3 is, that is, the lager the arrangement density of the gratings 30 is, so that a uniform grey level of the whole surface light source may be realized, meanwhile the light outgoing efficiency of the gratings 30 is increased.

In the present embodiment, further preferably, the backlight module further comprises a diffusion film (not shown in FIG. 4), which is provided between the optical fiber 2 and the display panel, so as to diffuse the mixed laser beam beams to obtain a back light which is more uniform and approximate to white light.

The backlight module in the present embodiment uses the laser light sources and the optical fibers with gratings to form the surface light source, so that a high light focusing effect of the backlight module can be realized without using the prism film; and since the laser light sources have wide gamut and high light utilization rate, wide gamut and high efficiency of the backlight module can be realized.

Embodiment 3

The present embodiment provides a backlight module, the light source of which may also use the surface light source in the embodiment 1. Difference between the present embodiment and the embodiment 2 is arrangement positions of the light outgoing windows.

In the present embodiment, the light outgoing windows are arranged with their backs facing towards the display plane, and accordingly in order to further increase the utilization rate of the light source, the backlight module further comprises a reflective film, the optical fibers are provided between the reflective film and the display panel, the reflective film is used to reflect the light outgoing from the gratings towards the liquid crystal display panel to form the back light.

As such, preferably, in order to further increase the uniformity of the light source, the backlight module further comprises a diffusion film, which is provided between the optical fibers and the display panel.

Other structures in the backlight module in the present embodiment are the same as those in the embodiment 2, and will not be described repeatedly here.

The backlight module in the present embodiment uses the laser light sources and the optical fibers with gratings to form the surface light source, so that wide gamut, high efficiency, and high light focusing effect of the backlight module can be realized.

Embodiment 4

Examples in which the light outgoing windows on the optical fiber face towards the display panel and are directed away from the display plane are described in the embodiments 2 and 3, respectively, and however, the embodiments 2 and 3 may be combined to realize the object of the invention. That is to say, the present invention further provides a backlight module, the backlight source of which may be the surface light source in the embodiment 1. In the present embodiment, a part of the light outgoing windows on the optical fiber face towards the display panel, and the other part of the light outgoing windows on the optical fiber are directed away from the display panel.

Accordingly, as described in the embodiments 2 and 3, in order to further increase the utilization rate of the light source, the backlight module further comprises a reflective film and a diffusion film, wherein the optical fibers are provided between the reflective film and the diffusion film, and the diffusion film is provided between the optical fibers and the display panel. The reflective film and the diffusion film in this embodiment are the same as the diffusion film in the embodiment 2 and the reflective film in the embodiment 3 in functions, respectively, and will not be described repeatedly here.

Other structures in the backlight module in the present embodiment are the same as those in the embodiment 2 or the embodiment 3, and will not be described repeatedly here.

The backlight module in the present embodiment uses the laser light sources and the optical fibers with gratings to form the surface light source, so that wide gamut, high efficiency, and high light focusing effect of the backlight module can be realized.

Embodiment 5

The present embodiment further provides a display device comprising the backlight module in any one of the embodiment 2 to the embodiment 4.

The display device may be any product or part which is provided with display function such as a liquid crystal panel, an electronic paper, a mobile phone, a tablet computer, a TV, a display, a notebook computer, a digital image frame, and a navigator.

The display device has better display effect by adopting the backlight module with wide gamut, high efficiency and high light focusing effect.

It should be understood that, the above embodiments are only exemplary embodiments used to explain the principle of the present invention and the protection scope of the present invention is not limited thereto. The person skilled in the art can make various variations and modifications without departing from the spirit and scope of the present invention, and these variations and modifications should be considered to belong to the protection scope of the present invention.

The invention claimed is:

1. A surface light source comprising at least one optical fiber and at least one light source, wherein the at least one light source is provided at one end of the at least one optical fiber one to one, the at least one optical fiber each is provided with a plurality of light outgoing windows with an interval therebetween along its length direction, a light beam emitted from each light source propagates in an optical fiber corresponding to the light source, and outgoes from the optical fiber through the plurality of light outgoing windows;

wherein each of the light outgoing windows of each of the at least one optical fiber is a grating formed with a plurality of slits which are equally spaced, on the surface of the optical fiber, and wherein the arrangement direction of the slits is perpendicular to the length direction of the optical fiber.

2. The surface light source of claim 1, wherein the at least one optical fiber is arranged in a linear manner or with its central axis bent, the central axis of the at least one optical fiber is arranged in one arrangement plane, and the light outgoing windows of each of the at least one optical fiber are arranged on at least one side of the arrangement plane.

3. The surface light source of claim 2, wherein the farther the distance from the corresponding light source is, the larger the arrangement density of the light outgoing windows of each of the at least one optical fiber is.

4. The surface light source of claim 2, wherein the at least one optical fiber includes three optical fibers which are arranged parallel to each other with central axes thereof bent, and the central axes are arranged in the arrangement plane; the at least one light source includes a red laser light source, a green laser light source and a blue laser light source, each of which is provided at one end of one of the three optical fibers, respectively.

5. The surface light source of claim 4, wherein a red laser beam, a green laser beam and a blue laser beam emitted from the red laser light source, the green laser light source and the blue laser light source respectively are mixed after outgoing from the light outgoing windows to form white light.

6. The surface light source of claim 1, wherein the at least one light source is a laser light source, and laser beam emitted from the laser light source is transmitted along the optical fiber and outgoes from the optical fiber through the gratings.

7. The surface light source of claim 6, wherein the inter-line period of the grating and the wavelength of the laser beam satisfy the following formula: $0.5 \leq \Lambda/\lambda \leq 1$, where $\Lambda$ is the inter-line period of the grating, and $\lambda$ is the wavelength of the laser.

8. The surface light source of claim 7, wherein an incidence angle at which the laser beam is incident on the optical fiber and an emergence angle at which the laser beam outgoes from the grating satisfy the following formula:

$n' \sin \phi_m - n_s \sin \theta_{in} = \lambda \cdot m/\Lambda$, where $\theta_{in}$ is the incidence angle at which the laser beam is incident on the grating, $\phi_m$ is the emergence angle at which the laser beam outgoes from the grating, $n'$ is the refractivity of air, $n_s$ is the refractivity of the grating, and m is the order of the diffraction spectrum of the grating.

9. The surface light source of claim 8, wherein the incidence angle at which the laser beam is incident on the grating is within a range from 50° to 80°, and the emergence angle at which the laser beam outgoes from the grating is within a range from −15° to 15°.

10. The surface light source of claim 1, wherein the optical fiber includes a core wire and a protection layer which are coaxially arranged, and wherein the protection layer is wrapped around the core wire and is made of transparent resin, and the light outgoing windows are provided in the protection layer.

11. The surface light source of claim 1, wherein the optical fiber is constituted by a core wire, and the light outgoing windows are provided on the outer surface of the core wire.

12. A backlight module comprising the surface light source of claim 1.

13. The backlight module of claim 12, wherein the arrangement plane is parallel to a display panel.

14. The backlight module of claim 13, wherein the light outgoing windows of the optical fibers face towards the display panel.

15. The backlight module of claim 14, wherein the backlight module further comprises a diffusion film, which is provided between the optical fibers and the display panel.

16. The backlight module of claim 13, wherein the light outgoing windows of the optical fibers are directed away from the display plane, the backlight module further comprises a reflective film, and the optical fibers are provided between the reflective film and the display panel.

17. The backlight module of claim 16, wherein the backlight module further comprises a diffusion film, which is provided between the optical fibers and the display panel.

18. The backlight module of claim 13, wherein a part of the light outgoing windows of the optical fibers face towards the display panel, and the other part of the light outgoing windows of the optical fibers are directed away from the display panel, and the optical fibers are provided between the reflective film and the display panel.

19. A display device comprising the backlight module of claim 12.

* * * * *